United States Patent
Nautiyal et al.

(10) Patent No.: US 8,321,649 B2
(45) Date of Patent: Nov. 27, 2012

(54) MEMORY CONTROLLER ADDRESS AND DATA PIN MULTIPLEXING

(75) Inventors: Hemant Nautiyal, Greater Noida (IN); Dhruv Satsangi, Agra (IN)

(73) Assignee: Freescale Semiconductor, Inc., Austin, TX (US)

( * ) Notice: Subject to any disclaimer, the term of this patent is extended or adjusted under 35 U.S.C. 154(b) by 52 days.

(21) Appl. No.: 13/050,948

(22) Filed: Mar. 18, 2011

(65) Prior Publication Data

US 2012/0239900 A1    Sep. 20, 2012

(51) Int. Cl.
*G06F 12/02* (2006.01)
(52) U.S. Cl. ........... 711/170; 365/230.02; 711/172; 711/173; 711/219
(58) Field of Classification Search .......... 711/170, 711/172, 173, 219; 365/230.02
See application file for complete search history.

(56) References Cited

U.S. PATENT DOCUMENTS

| | | | |
|---|---|---|---|
| 4,675,808 A | | 6/1987 | Grinn |
| 5,014,191 A | * | 5/1991 | Padgaonkar et al. .......... 711/163 |
| 5,600,606 A | * | 2/1997 | Rao .......................... 365/233.1 |
| 6,778,463 B2 | | 8/2004 | Chen |
| 7,058,778 B2 | | 6/2006 | Swanson |
| 7,437,497 B2 | | 10/2008 | Cornelius |
| 7,493,467 B2 | | 2/2009 | Gould |
| 7,617,354 B2 | * | 11/2009 | Oh ............................... 711/105 |
| 2003/0028733 A1 | * | 2/2003 | Tsunoda et al. ............... 711/154 |
| 2003/0065898 A1 | * | 4/2003 | Flamma et al. ............... 711/165 |
| 2008/0201542 A1 | * | 8/2008 | Maruyama et al. ........... 711/165 |
| 2011/0138106 A1 | * | 6/2011 | Prabhakaran et al. ........ 711/103 |

* cited by examiner

*Primary Examiner* — Jae Yu
(74) *Attorney, Agent, or Firm* — Charles Bergere

(57) ABSTRACT

A system and a method for configuring a memory controller that communicates with a memory device muxes selected pins for the data transfer. The memory controller includes a set of pins where each pin of the set is associated with a data bit and an address bit. A programmable logic block is connected to the set of pins and uses a subset of the set of pins to enable data transfer between the memory device and the memory controller depending on the size of the memory device such that the pins not included in the subset are available for other applications.

12 Claims, 7 Drawing Sheets

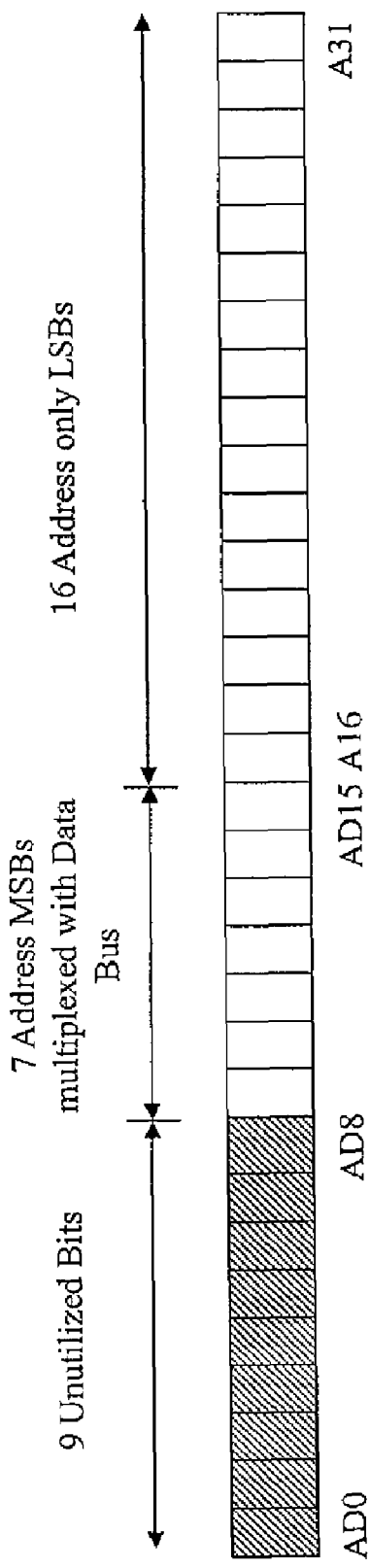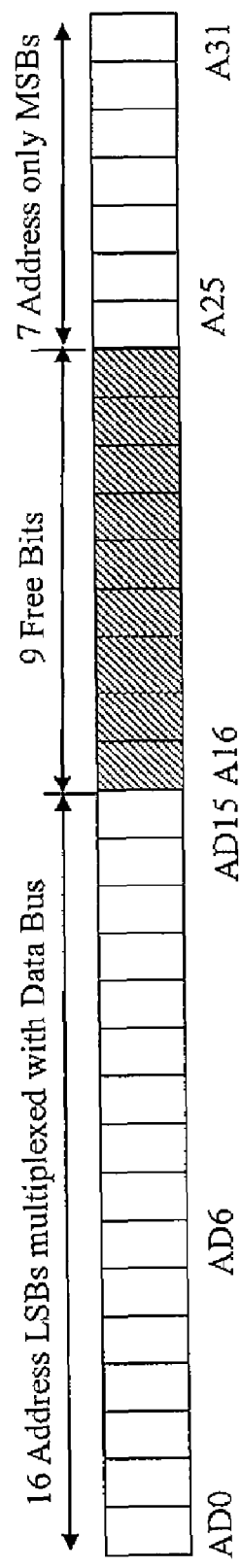
FIG. 5A
FIG. 5B

MEMORY CONTROLLER ADDRESS AND DATA PIN MULTIPLEXING

BACKGROUND OF THE INVENTION

The present invention relates to a memory controller, and more particularly, to a method and system for configuring a memory controller to enable data transfer between the memory controller and one or more other devices.

Most computer systems today use advanced circuitry for communication and data transfer purposes. These computer systems typically include a memory controller for managing communications between a memory device and the microcontroller/microprocessor. Such systems are usually implemented using printed circuit boards (PCBs), which are designed to have efficient and compact circuits. Thus, efficient utilization of space is a major concern when designing these circuits. Various size address widths and data paths, along with different types of memories have necessitated the need for a number of pins of the memory controller. Thus, there is a need for managing the pin usage in order to keep the overall pin count down.

One way to reduce the pin count is to use one or more pins of the memory controller for multiple applications. In traditional systems, the pin count of an integrated circuit is reduced by multiplexing the address bus and the data bus. In such systems, one or more pins that carry address bits also carry data bits at a different time interval, or based on a control signal. In one such system, the pins carrying the most significant bits (MSBs) of the memory address are multiplexed with a data bus. The pins are multiplexed using a control signal such that address bits are transferred when the control signal is high and data bits are transferred when the control signal is low, or vice versa. However, if the memory size is decreased and all the pins designated to carry address bits for addressing the memory device are not required, there is an ineffective utilization of pins, as the unutilized pins cannot be used for any other application.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

FIG. 5A illustrates an arrangement of address bits corresponding to the pins of the memory controller of a System on Chip;

FIG. 5B illustrates an arrangement of address bits corresponding to the pins of the System on Chip in accordance with another embodiment of the invention;

DETAILED DESCRIPTION OF THE INVENTION

Figure 1:
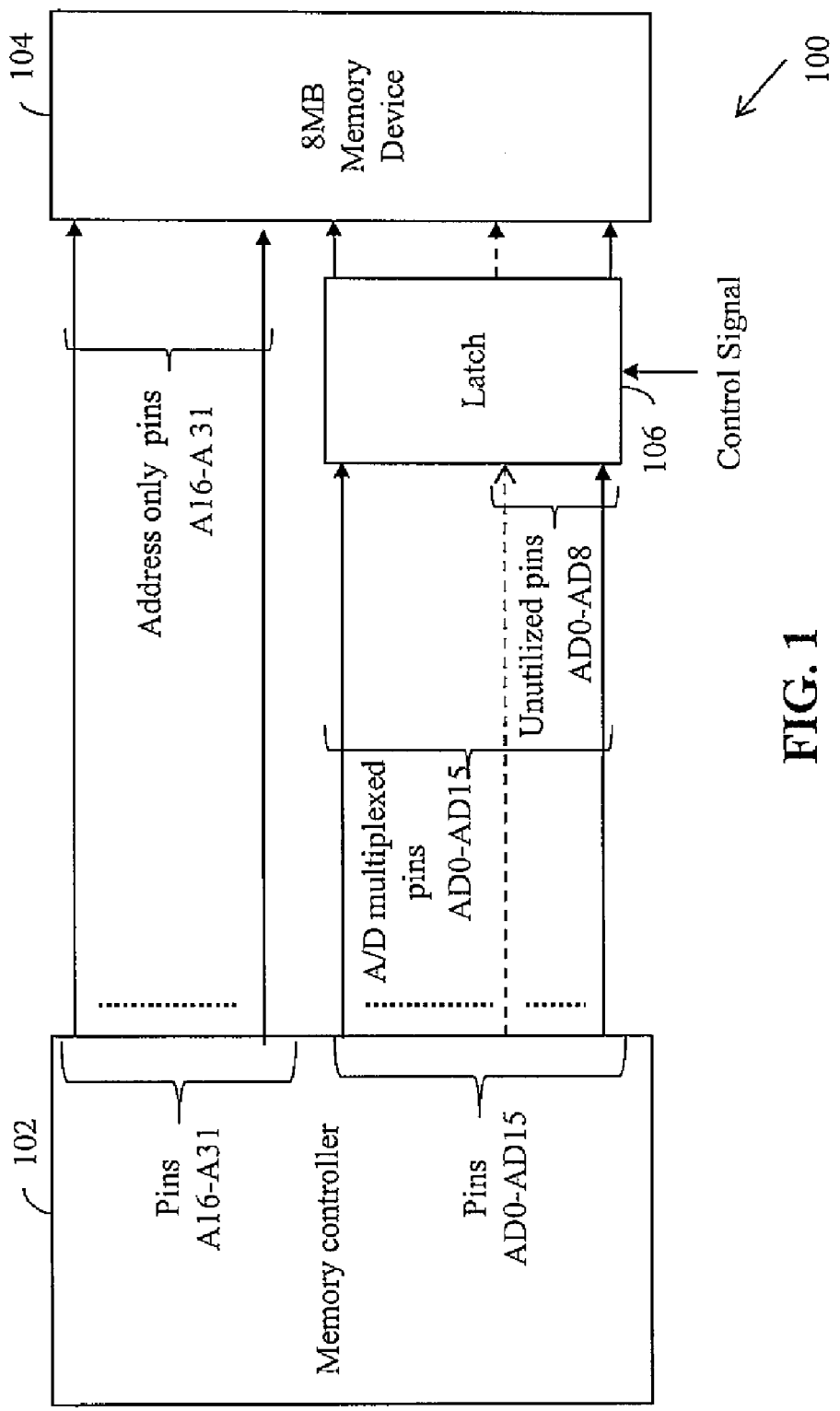
FIG. 1 is a schematic block diagram illustrating a conventional system for interfacing a memory controller with a memory device.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a system for configuring a memory controller that communicates with a memory device is provided. The memory controller includes a set of pins and each pin of the set of pins is associated with a data bit or an address bit or both. The system includes a programmable logic block that is connected to the set of pins of the memory controller for using a subset of the set of pins to enable data transfer between the memory device and the memory controller. The pins are selected in accordance with the size of the memory device such that the pins outside the subset are available for one or more applications.

In another embodiment of the invention, a system for configuring a memory controller for communicating with a memory device is provided. The memory controller includes a set of pins such that each pin of the set of pins is associated with a data bit or an address bit, or both. The system includes a programmable logic block connected to the set of pins of the memory controller for selecting a subset of the set of pins to enable data transfer between the memory device and the memory controller. The selection of the subset is performed by re-organizing one or more address bits among the set of pins of the memory controller in accordance with the size of the memory device. A latch is connected to the programmable logic block for multiplexing address and data bits on a plurality of pins of the subset of pins to transfer data between the memory device and the memory controller.

In yet another embodiment of the invention, a method for configuring a memory controller for communicating with a memory device is provided. The memory controller includes a set of pins such that each pin of the set of pins is associated with at least one of a data bit and an address bit. The method includes the steps of selecting a subset of the set of pins to enable data transfer between the memory device and the memory controller. The selection of the subset is performed by re-organizing address bits among the set of pins of the memory controller in accordance with the size of the memory device. The method further includes multiplexing address and data bits on a plurality of pins of the subset of pins to transfer data between the memory device and the memory controller.

In accordance with the present invention, a system for configuring a memory controller is provided. The memory controller includes a plurality of pins for transmitting one of the address bits and the data bits at a given time. A set of pins from the plurality of pins can be used for communicating with a memory device. The present invention is described below with reference to a memory controller that can be used to address a maximum of 4 Gigabytes (GB) of memory, which requires 32 address bits. In this case, if a memory device of 4 GB is connected to the memory controller, all 32 pins of the set of pins of the memory controller are used for communicating with the memory device. It will be understood by a person skilled in art that the invention is applicable to other size memory devices and the description specifying a 4 GB memory device is illustrative.

FIG. 1 is a schematic block diagram illustrating a conventional system 100 for interfacing a memory controller 102 with an 8 megabyte memory device 104. The system 100 includes the memory controller 102, the memory device 104 and a latch 106. The memory controller 102 includes 32 pins AD0-AD15 and A16-A31 for carrying at least one of address bits and data bits. The 16 most significant bits (MSBs), corresponding to pins number AD0 to AD15 are multiplexed through the latch 106, and include one of data bits and address bits, based on a control signal provided by a control pin. When the control signal is high, the pins AD0-AD15 carry address bits and when the control signal is low, data bits are transmitted through the pins AD0-AD15. The pins A16 to A31 (A16-A31) of the memory controller 102 carry the address least significant bits (LSBs) only for the memory device 104. For a person skilled in art, it is understood that the 8 MB memory device 104 requires 23 bits for addressing. Thus, only the pins AD9-AD15 and A16-A31 are used for carrying the required address bits (23 LSBs) and the pins AD0-AD8 (corresponding to the 9 MSBs) are unused. This results in a loss of a significant amount of space, as the unused pins AD0-AD8 cannot be used for any other applications.

Figure 2:
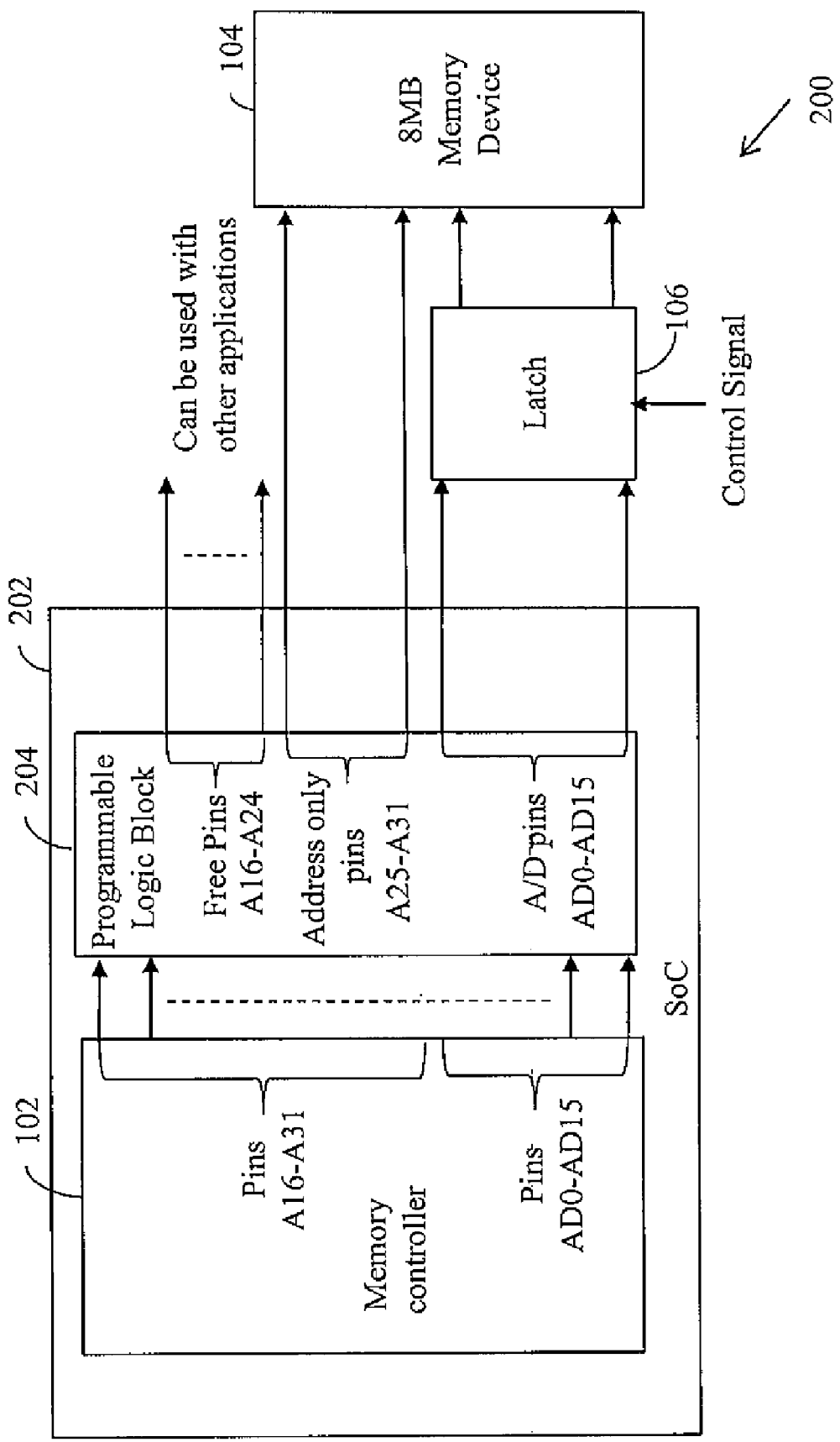
FIG. 2 is a schematic block diagram illustrating a system for interfacing a memory controller with a memory device in accordance with an embodiment of the present invention.
Figure 3:
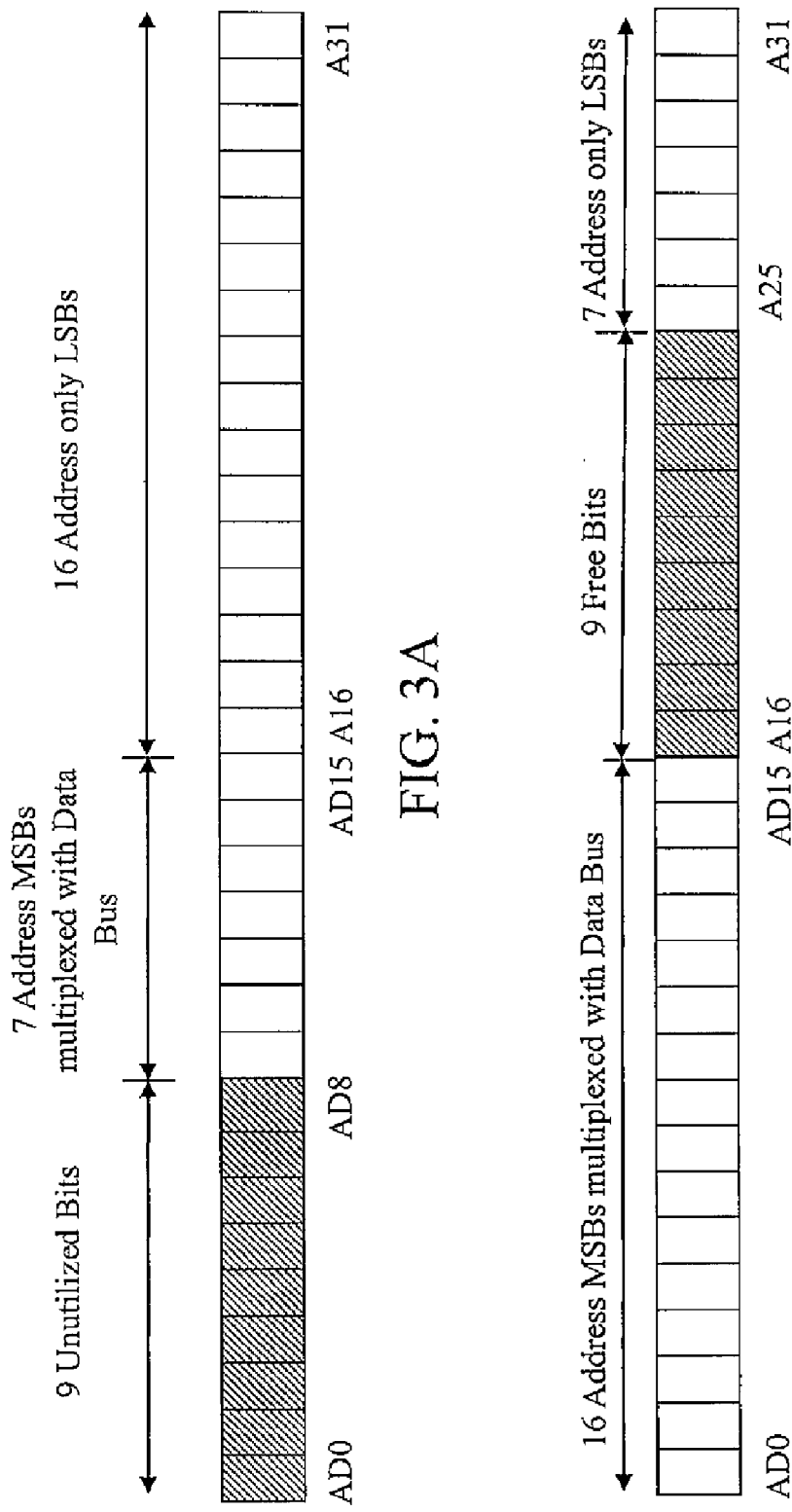
FIG. 3A illustrates an arrangement of address bits corresponding to the pins of the memory controller of a System on Chip.
FIG. 3B illustrates an arrangement of address bits corresponding to the pins of the System on Chip in accordance with an embodiment of the invention.

FIG. 2 is a schematic block diagram illustrating a system 200 for interfacing the memory controller 102 with the memory device 104, in accordance with an embodiment of the present invention. The system 200 includes a System on Chip (SoC) 202, the memory device 104 and the latch 106 of FIG. 1. The SoC 202 further includes the memory controller 102 and a programmable logic block 204. The SoC 202 is connected to the memory device 104 through multiple pins. In an embodiment of the invention, the programmable logic block 204 is connected to 32 pins of the memory controller 102. The programmable logic block 204 selects a subset of pins from the set of 32 pins, where the subset of pins is used for communicating with the 8 MB memory device 104. In accordance with an embodiment of the invention, the subset includes 23 pins for communicating with the 8 MB memory device 104.

The memory controller 102 transmits one or more address bits over the pins AD0-AD15 and A6-A31 to the programmable logic block 204. At the programmable logic block 204, the bits are re-organized for selecting the subset of 23 pins being used for communication with the memory device 104. The re-organizing of address bits by the programmable logic block 204 is discussed in greater detail in conjunction with FIGS. 3-6. In an embodiment of the invention, the 16 most significant bits (MSBs) corresponding to pins AD0 to AD15 (AD0-AD15) are multiplexed through the latch 106, and both data bits and address bits are transmitted, based on a control signal. When the control signal is high, the pins AD0-AD15 carry address bits and when the control signal is low, data bits are transmitted through the pins AD0-AD15. Further, based on the selected subset of 23 pins, the pins A25 to A31 (A25-A31) carry address LSBs and the pins A16 to A24 (A16-A24) are free to be used with one or more other applications. In different embodiments of the invention, the one or more other applications include communicating with another memory device and communicating with an I/O device.

In order to assign specific bits to be carried by one or more pins, the address bits are reorganized by the programmable logic block 204. In one embodiment of the invention, the bits are re-organized by left shifting a plurality of bits from the subset of pins selected for communicating with the memory device 104. In a second embodiment of the invention, the bits are re-organized by right shifting a plurality of bits from the subset of pins selected for communicating with the memory device 104.

FIG. 3A illustrates an arrangement of address bits corresponding to the pins of the memory controller 102 of the SoC 202 in accordance with the present invention, wherein the pins corresponding to the address MSBs are latched with the pins for data bits to be transferred. Since the 16 MSBs of the set of address bits are designed to carry both the address bits and the data bits, these are represented as corresponding to the pins AD0-AD15. Further, the 16 LSBs in FIG. 3A are address only bits, and are represented as corresponding to the pins A16-A31. The memory controller 102 communicates with the 8 MB memory device 104 and only 23 bits are utilized for carrying address information. As shown in FIG. 3A, the 23 bits are the LSBs of the complete set of 32 address bits of the SoC 202 and are represented as corresponding to the pins A16-A31. Further, only 7 of the bits are used in the address-data multiplexed pins, such that if directly used for communication with the memory device 104, it will lead to inefficient utilization of the address data multiplexed pins. These correspond to the pins AD9-AD15 in FIG. 3A. However, at this stage, there is a partial utilization of address data multiplexed pins. This is improved at the next stage with the use of the programmable logic block 204.

FIG. 3B illustrates an arrangement of address bits corresponding to the pins of the output of SoC 202 in accordance with an embodiment of the invention. The address bits corresponding to the pins AD0-AD15 and A16-A31 are re-organized by the programmable logic block 204, such that the address-data multiplexed pins are effectively utilized in the communication between the memory controller 102 and the memory device 104. As shown in FIG. 3B, the address bits of are re-organized by left shifting the 16 MSBs illustrated in FIG. 3A such that the address-data multiplexed pins AD0-AD15 transmit valid address information and are effectively utilized. The 7 LSBs are retained at their original position (A25-A31).

Figure 4:
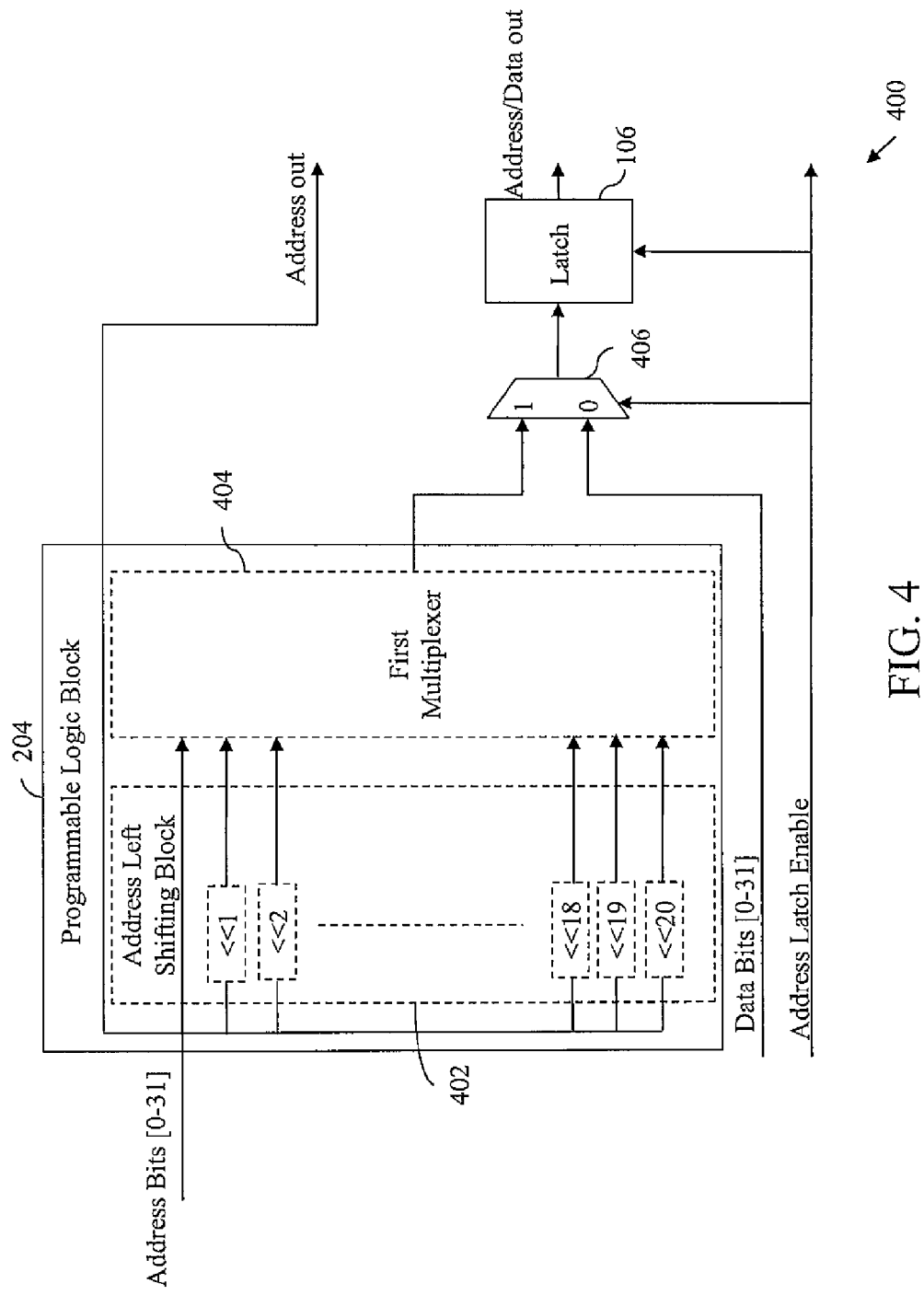
FIG. 4 is a schematic block diagram of a programmable logic block of the memory controller interface of FIG. 2 in accordance with an embodiment of the invention.

FIG. 4 is a schematic block diagram of the programmable logic block 204 in accordance with an embodiment of the invention. As already discussed in conjunction with FIG. 2, the bits corresponding to the pins of the memory controller 102 are re-organized for selecting the subset of pins being used for communication with the 8 MB memory device 104. In an embodiment of the invention, the re-organization is done by left shifting a plurality of desired bits by the programmable logic block 204. In FIG. 4, the programmable logic block 204 includes an address left shifting block 402 and a first multiplexer 404. The system of FIG. 4 further includes a second multiplexer 406 and a latch 106. In accordance with an embodiment of the invention, the left shifting block 402 and the first multiplexer 404 of the programmable logic block 204 function as a selector for selecting second subset of pins for communicating with one or more applications. The programmable logic block 204 is pre-programmed to left shift a plurality of bits from the subset of 23 pins by a predetermined count. For instance, in the example of FIG. 3, the bits AD9-A24 are left shifted by a predetermined count of 9 (since there are 9 unused pins when implementing a 8 MB memory device). This enables the freeing up of pins A16-

A24, which then can be used for one or more other applications such as addressing another memory device, or communicating with an I/O device.

The 32 address bits (represented as Address bits [0-31]) of the memory controller 102 are received by the address left shifting block 402, which left shifts the plurality of desired bits by the predetermined count of 9, such that all the left shifted bits are transmitted through the pins AD0-AD16, that are multiplexed to carry both the address and data bits. The left shifted bits are provided to the second multiplexer 406, which multiplexes the left shifted address bits and the data bits. The second multiplexer 406 passes the left shifted address bits when Address Latch Enable Signal (ALE) is high. In an embodiment of the invention, the latch 106 is an external latch. The latch 106 is present at the output of the multiplexer 406 and latches the left shifted address bits when ALE is high. Both the multiplexer 406 and the latch 106 receive the ALE signal. The address bits not shifted by the address left shifting block 402 are directly output at the address output pin of FIG. 4.

FIG. 5A illustrates an arrangement of address bits corresponding to the pins of the memory controller 102 of the SoC 202 in accordance with the present invention, where the pins corresponding to the address MSBs are latched with the pins that carry the data bits to be transferred. The 16 LSBs in FIG. 5A are address only bits, and are represented as corresponding to the pins A16-A31. The memory controller 102 communicates with the 8 MB memory device 104 and only 23 bits are utilized for carrying address information. Since the 7 MSBs of the set of address bits are designed to carry both the address bits and the data bits, these are represented as corresponding to the pins AD9-AD15. Further, the remaining 9 address MSBs corresponding to the pins AD0-AD8 are also multiplexed with the data bits but these do not carry relevant address information and can be used for freeing up the other pins for usage with other applications. This is done at the next stage where the bits corresponding to the pins of the memory controller 102 are re-organized by the programmable logic block 204 such that the pins may be used for other applications.

FIG. 5B illustrates an arrangement of address bits corresponding to the pins of the output of the SoC 202 in accordance with another embodiment of the invention. The address bits corresponding to the pins AD0-AD15 and A16-A31 are re-organized such that the address-data multiplexed pins are effectively utilized for the communication between the memory controller 102 and the memory device 104. As shown in FIG. 5B, the bits are re-organized by right shifting the 7 address MSBs (AD9-AD15) of FIG. 5A to the pins corresponding to MSBs (A25-A31) of FIG. 5B. Further, the next 16 address bits A16-A31 are left shifted to the LSBs AD0-AD15, resulting in freeing up of the pins corresponding to the bits A16-A24.

Figure 6:
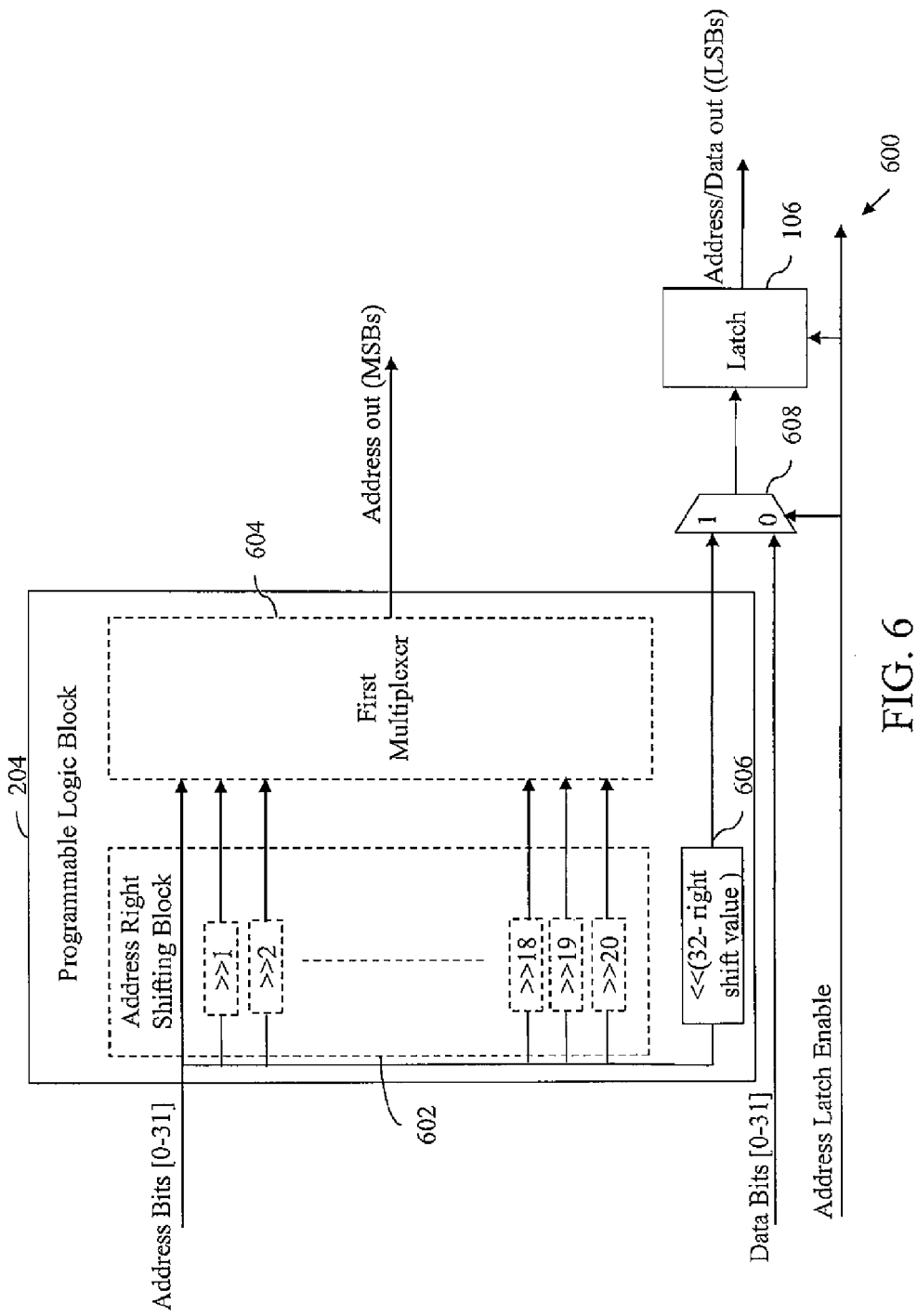
FIG. 6 is a schematic block diagram of a programmable logic block of the memory controller interface in accordance with another embodiment of the invention.

FIG. 6 is a schematic block diagram of the programmable logic block 204 in accordance with an embodiment of the invention. As already discussed in conjunction with FIG. 2, the bits corresponding to the pins of the memory controller 102 are re-organized for selecting the subset of pins being used for communicating with the 8 MB memory device 104. In an embodiment of the invention, the re-organization is done by right shifting a plurality of desired bits by the programmable logic block 204. The programmable logic block 204 includes an address right shifting block 602, a first multiplexer 604 and a left shift block 606. The system of FIG. 4 further includes a second multiplexer 608 and a latch 106. In accordance with an embodiment of the invention, the right shifting block 602, the first multiplexer 604 and the left shifting block 606 function as a selector for selecting second subset of pins for communicating with one or more applications. The programmable logic block 204 is pre-programmed to right shift a plurality of bits from the subset of 23 pins by a predetermined count. For instance, in the example of FIG. 5A, the bits AD0-AD6 are shifted towards the right by a predetermined count. In an embodiment of the invention, the predetermined count is such that the MSBs of the address are aligned to the index 31 of the register space AD0-A31. In the embodiment illustrated in FIG. 5B, the bits AD9-AD15 are right shifted by the predetermined count of 16. Further, the left shift block 606 left shifts the remaining address bits A16-A31 such that they are re-organized as the bits AD0-AD15. This enables the freeing up of pins A16-A24, which then can be used for one or more other applications such as addressing another memory device, or communicating with an I/O device.

The 32 address bits (represented as Address bits [0-31]) are received by the address right shifting block 602, which right shifts the plurality of desired bits by the predetermined count of 16 to align the MSBs of the address to the index 31. The right shifted bits are then provided to the Address Out pin through the first multiplexer 604. A second set of bits, among the bits that have not been right shifted (for example, A16-A31 of FIG. 5A) are left shifted by the left shift block 608, such that the left shifted blocks occupy the LSBs AD0-AD15 of FIG. 5B. The left shifted bits are then provided to the latch 106 through the second multiplexer 608. The latch 106 latches the left shifted address bits of the Address bits [0-31] in FIG. 6 and the data bits, represented by Data bits [0-31] in FIG. 6. In an embodiment of the invention, the latch 106 is an external latch. The latching is done in conjunction with an Address Latch Enable (ALE) signal. When the ALE is high, the second multiplexer 608 outputs the address bits, which get latched by latch 106, and when the ALE is low, the second multiplexer 608 outputs the data bits [0-31].

Figure 7:
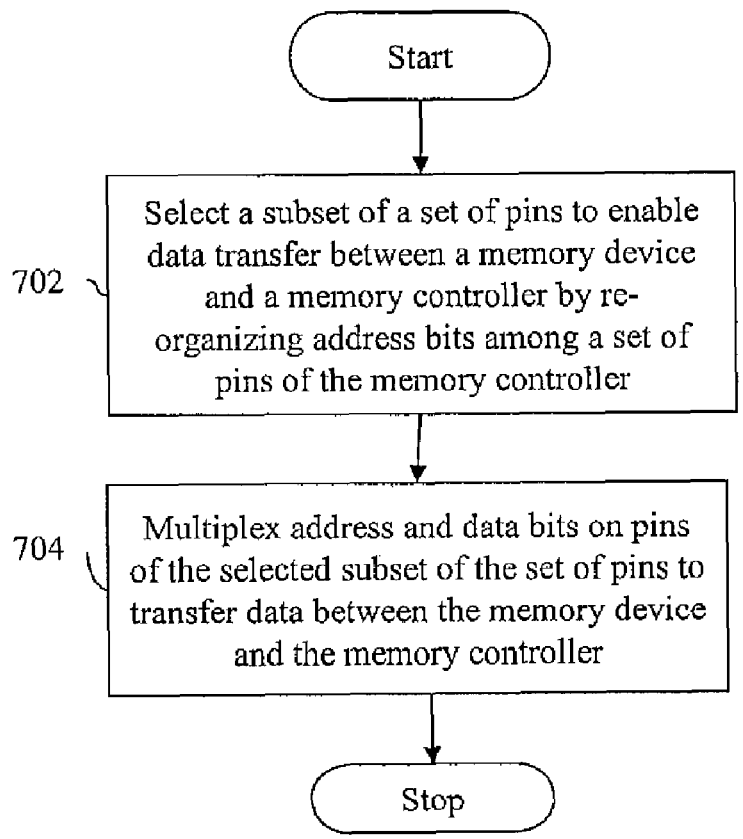
FIG. 7 is a flow chart illustrating a method for configuring a memory controller in accordance with an embodiment of the present invention.

FIG. 7 is a flow chart 700 illustrating a method for configuring a memory controller in accordance with an embodiment of the present invention. The flowchart 700 is described in conjunction with FIG. 2. At step 702, a subset from a set of pins in an IC device is selected to enable data transfer between the memory controller 102 and the memory device 104. This is accomplished by re-organizing address bits among a set of output pins of the SoC 202 by the programmable logic block 204. At step 704, the communication between the memory controller 102 and the memory device 104 is enabled by multiplexing address and data bits on a predetermined plurality of pins, where the predetermined plurality of pins belong to the subset selected for communication between the memory controller 102 and the memory device 104.

The method and the system described above have a number of advantages. The method is implemented to allow maximum pin sharing between the address and data bits. Further, the same set of pins may be utilized for one or more other applications such as for communicating with another memory device and communicating with an Input/output device. This leads to an improved low cost and space effective IC device. Further, the invention can be used to add value to the low and ultra-low end SOCs in which the number of pins is very limited. The programmable logic block may be programmed to free up the unused pins depending on the size of the memory device. It also facilitates low cost, low power system design as the number of pins in a part can be reduced using the present invention.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A system for configuring a memory controller, the memory controller suitable for communicating with a memory device, the memory controller including a set of pins, each pin of the set of pins being associated with at least one of a data bit and an address bit, the system comprising:
a programmable logic block connected to the set of pins of the memory controller, the programmable logic block selecting a subset of the set of pins to enable data transfer between the memory device and the memory controller, wherein the selection of the subset is performed by re-organizing one or more address bits among the set of pins of the memory controller in accordance with the size of the memory device;
a multiplexer connected to the programmable logic block for multiplexing address and data bits; and
a latch connected between the multiplexer and the memory device, the latch latching the multiplexed address and data bits on a plurality of pins from the subset of pins to transfer address and data bits between the memory device and the memory controller, wherein each of the latch and the multiplexer includes a control pin for receiving a control signal indicating multiplexing of address and data bits, wherein the control signal indicates a transfer of one of the address bits and the data bits, wherein multiplexing address and data bits on a plurality of pins comprises multiplexing one or more most significant bits (HSBs) of the address bits with data bits.

2. The system of claim 1, wherein multiplexing address and data bits on a plurality of pins comprises multiplexing one or more least significant bits (LSBs) of the address bits with the data bits.

3. The system of claim 1, wherein the programmable logic block comprises an address shifting block for re-organizing one or more address bits among the set of pins of the memory controller by left shifting the one or more address bits in accordance with the size of the memory device.

4. The system of claim 1, wherein the programmable logic block comprises an address shifting block for re-organizing one or more of the address bits among the set of pins of the memory controller by right shifting the one or more of the address bits in accordance with the size of the memory device.

5. The system of claim 1, wherein the programmable logic block comprises a selector for selecting a second subset of pins for communicating with one or more other applications, the communication being performed using remaining ones of the re-organized address bits, wherein the remaining ones of the re-organized address bits correspond to the second subset of pins.

6. A method for configuring a memory controller that communicates with a memory device, the memory controller including a set of pins, each pin of the set of pins being associated with at least one of a data bit and an address bit, the method comprising:
selecting a subset of the set of pins to enable data transfer between the memory device and the memory controller, the selection of the subset being performed by re-organizing address bits among the set of pins of the memory controller in accordance with the size of the memory device; and
multiplexing address bits and data bits on a plurality of pins of the subset of pins to transfer data between the memory device and the memory controller, wherein multiplexing the address and data bits on a plurality of pins comprises multiplexing one or more most significant bits (HSBs) of the address bits with data bits.

7. The method of claim 6, wherein multiplexing of address and data bits is controlled with a control signal that indicates the transfer of one of the address bits and the data bits.

8. The method of claim 6, wherein multiplexing the address and data bits on a plurality of pins comprises multiplexing one or more least significant bits (LSBs) of the address bits with the data bits.

9. The method of claim 6, wherein re-organizing address bits among the set of pins of the memory controller comprises left shifting one or more of the address bits in accordance with the size of the memory device.

10. The method of claim 6, wherein re-organizing address bits among the set of pins of the memory controller comprises right shifting one or more of the address bits in accordance with the size of the memory device.

11. The method of claim 6, wherein the data transfer between the memory device and the memory controller comprises reading data from the memory device.

12. The method of claim 6, wherein the data transfer between the memory device and the memory controller comprises writing data from the memory controller to the memory device.

* * * * *